(12) United States Patent
Tian et al.

(10) Patent No.: US 8,340,812 B1
(45) Date of Patent: Dec. 25, 2012

(54) OPTIMIZATION OF PACKAGING SIZES

(75) Inventors: Hong Tian, Seattle, WA (US);
Mackenzie Smith, Issaquah, WA (US);
Devesh Mishra, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 518 days.

(21) Appl. No.: 11/847,735

(22) Filed: Aug. 30, 2007

(51) Int. Cl.
*G06F 7/00* (2006.01)

(52) U.S. Cl. ............................. 700/216; 700/97; 53/396

(58) Field of Classification Search .................. 700/28, 700/97, 99, 171, 213, 214, 216, 219; 703/6, 703/7, 1; 705/26.8, 26.81, 28; 53/52, 396, 53/452, 457, 458
See application file for complete search history.

(56) References Cited

U.S. PATENT DOCUMENTS

| | | | | |
|---|---|---|---|---|
| 4,809,482 A * | 3/1989 | Horton et al. ............... 53/131.3 |
| 5,171,120 A * | 12/1992 | Bernard et al. ........... 414/331.03 |
| 5,593,269 A * | 1/1997 | Bernard, II .............. 414/331.04 |
| 5,758,257 A * | 5/1998 | Herz et al. ........................ 705/51 |
| 5,783,810 A * | 7/1998 | Kelly, Jr. ........................ 235/385 |
| 5,936,863 A * | 8/1999 | Kostelnik et al. ............. 700/171 |
| 6,123,199 A * | 9/2000 | Madsen ........................ 206/586 |
| 6,155,025 A * | 12/2000 | Komiya et al. ................. 53/147 |
| 6,611,732 B2 * | 8/2003 | Okamura ...................... 700/226 |
| 6,615,104 B2 * | 9/2003 | England et al. .............. 700/213 |
| 6,705,526 B1 * | 3/2004 | Zhu et al. ................. 235/472.01 |
| 6,711,798 B2 * | 3/2004 | Sanders et al. ............. 29/407.01 |
| 6,721,762 B1 * | 4/2004 | Levine et al. ......................... 1/1 |
| 6,748,285 B2 * | 6/2004 | Bozich et al. .................. 700/97 |
| 6,817,163 B2 * | 11/2004 | Limousin ........................ 53/568 |
| 6,876,958 B1 * | 4/2005 | Chowdhury et al. ............. 703/7 |
| 6,882,892 B2 * | 4/2005 | Farrah et al. ..................... 700/97 |
| 6,912,830 B2 * | 7/2005 | Limousin ........................ 53/459 |
| 6,974,928 B2 * | 12/2005 | Bloom ........................... 209/583 |
| 7,076,936 B2 * | 7/2006 | Limousin ........................ 53/568 |
| 7,085,677 B1 * | 8/2006 | Champlin et al. ............ 702/182 |
| 7,085,687 B2 * | 8/2006 | Eckenwiler et al. .............. 703/1 |
| 7,177,825 B1 * | 2/2007 | Borders et al. .................. 705/26 |
| 7,184,178 B2 * | 2/2007 | Panunto et al. .............. 358/3.28 |
| 7,329,081 B2 * | 2/2008 | Baker et al. ................... 414/626 |
| 7,346,554 B2 * | 3/2008 | Sano et al. ....................... 705/26 |
| 7,366,643 B2 * | 4/2008 | Verdura et al. ..................... 703/1 |
| 7,621,404 B2 * | 11/2009 | Murray .......................... 206/594 |
| 7,653,457 B2 * | 1/2010 | Bloom ........................... 700/216 |
| 7,775,349 B2 * | 8/2010 | Walker .......................... 206/162 |
| 2002/0007618 A1 * | 1/2002 | Armington et al. ............. 53/472 |
| 2002/0091583 A1 * | 7/2002 | Koyama .......................... 705/26 |
| 2003/0083763 A1 * | 5/2003 | Kiyohara et al. ............... 700/97 |
| 2003/0110102 A1 * | 6/2003 | Chien et al. ..................... 705/28 |
| 2003/0200111 A1 * | 10/2003 | Damji ............................... 705/1 |
| 2003/0208415 A1 * | 11/2003 | Sano et al. ....................... 705/26 |
| 2004/0083688 A1 * | 5/2004 | Limousin ........................ 53/442 |
| 2004/0128265 A1 * | 7/2004 | Holtz et al. .................... 705/406 |
| 2004/0153379 A1 * | 8/2004 | Joyce et al. ..................... 705/28 |
| 2004/0267677 A1 * | 12/2004 | Mitsuoka et al. ............. 705/400 |
| 2005/0055181 A1 * | 3/2005 | Verdura et al. .................. 700/97 |
| 2005/0150192 A1 * | 7/2005 | Armington et al. ............. 53/472 |

(Continued)

*Primary Examiner* — Charles Kasenge
(74) *Attorney, Agent, or Firm* — Thomas|Horstemeyer, LLP (57) ABSTRACT

Various systems, methods, and programs embodied in computer-readable mediums are provided for determining optimum sizes of packaging in a packaging suite employed in a materials handling facility. The packaging may be used, for example, in the shipping of items from the materials handling facility to various destinations. The sizes of the packaging in the packaging suite are determined based upon the shipping volumes associated with packages or shipments shipped from the materials handling facility.

44 Claims, 5 Drawing Sheets

U.S. PATENT DOCUMENTS

| | | | |
|---|---|---|---|
| 2005/0197876 A1* | 9/2005 | Benda et al. | 705/7 |
| 2006/0020366 A1* | 1/2006 | Bloom | 700/226 |
| 2006/0229951 A1* | 10/2006 | Abels et al. | 705/26 |
| 2007/0078725 A1* | 4/2007 | Koszewski et al. | 705/26 |
| 2007/0136150 A1* | 6/2007 | Biancavilla et al. | 705/28 |
| 2007/0192215 A1* | 8/2007 | Taylor et al. | 705/28 |
| 2007/0289253 A1* | 12/2007 | Miller | 53/218 |
| 2008/0004931 A1* | 1/2008 | Kambs et al. | 705/8 |
| 2008/0047851 A1* | 2/2008 | Smit et al. | 206/223 |
| 2008/0197037 A1* | 8/2008 | O'Brien et al. | 206/429 |

\* cited by examiner

OPTIMIZATION OF PACKAGING SIZES

BACKGROUND

In various materials handling facilities, it is often the case that products are shipped to various destinations using various packaging. For example, one facility may ship products purchased over the Internet to various customers. In order to ship products to their various destinations, a materials handling facility may include various types of packaging in which products are placed before shipment. The packaging serves to protect the products during shipment. Unfortunately, it is usually the case that the packaging used to ship a given product is not sized correctly, such that the packaging may be bigger than that necessary to ship the given product. This translates into lost space on trucks and other transportation vehicles that, as a result, carry less products than they could if the packaging matched the size of the products. Also, the mismatch between product sizes and packaging sizes can result in other costs.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
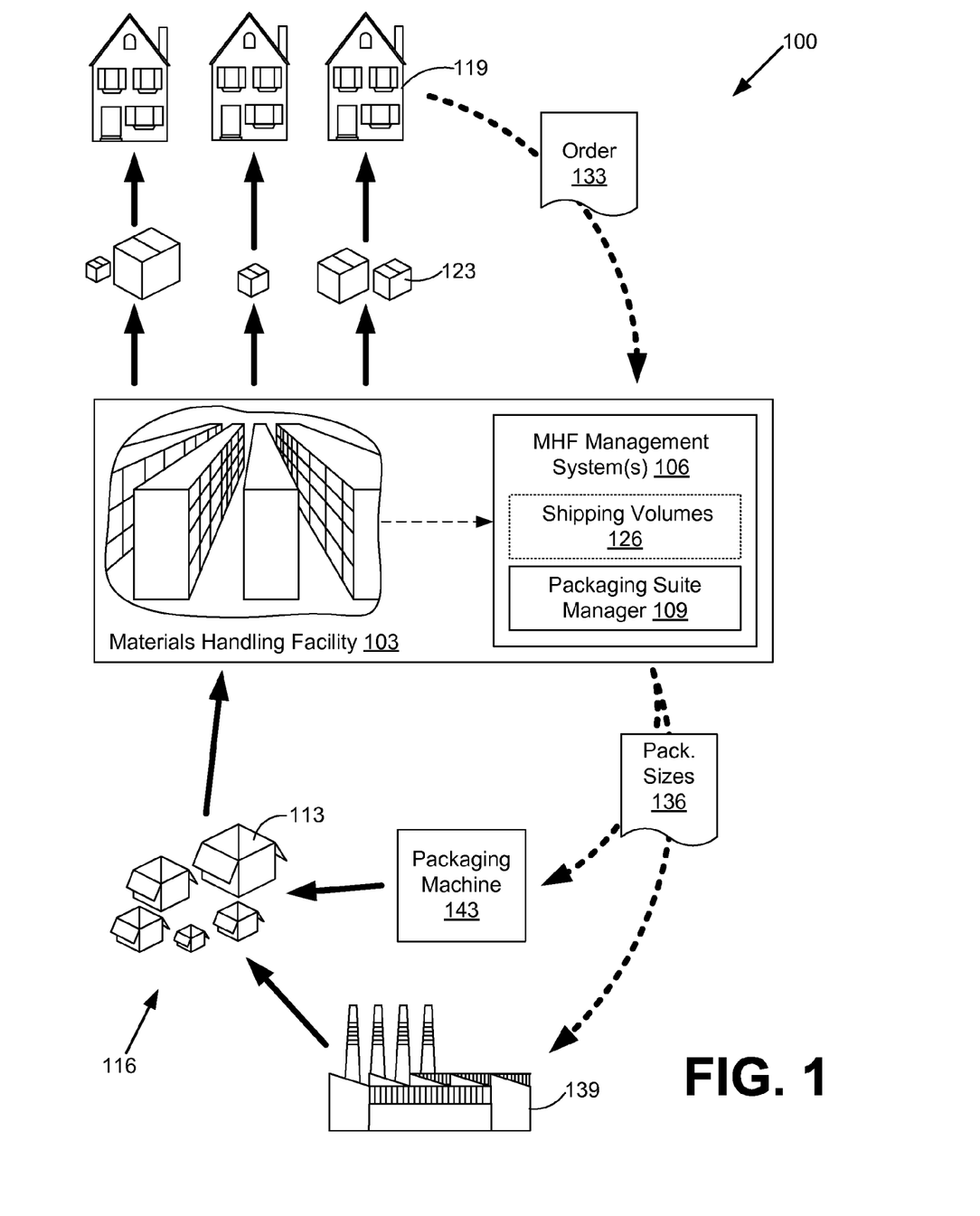
FIG. 1 is a drawing of an order fulfillment environment according to an embodiment of the present invention.

With reference to FIG. 1, shown is a materials handling environment 100 that illustrates a flow of information and physical items in a manner that facilitates an optimization of packaging employed by a materials handling facility 103 according to an embodiment of the present invention. The materials handling environment 100 includes at least one materials handling facility 103. The materials handling facility 103 may comprise, for example, an order fulfillment center, distribution center, warehouse, cross-docking facilities, packaging facility, shipping facility, or other facilities, or combinations of such facilities for performing one or more functions of material or inventory handling.

The operation of the materials handling facility 103 is orchestrated by various materials handling facility management systems 106. Such systems may include, for example, an order processing system, inventory control systems, security systems, routing systems, and many other systems. Among the materials handling facility management systems 106 of the materials handling facility 103 is a packaging suite manager 109.

The packaging suite manager 109 is employed to identify optimum sizes of packaging 113 in a packaging suite 116 that is used by the materials handling facility 103 to package items for shipment to respective shipping destinations 119. In this respect, the materials handling facility 103 packages items in the packaging 113 and ships the items in the resulting packages 123 to the ultimate shipping destinations 119. The shipping destinations 119 may comprise, for example, residential locations, commercial locations, governmental locations, internal locations within a given materials handling facility 103 or other facility, or other destinations. Items that are packaged using the packaging 113 are shipped to the destinations 119 as packages 123.

In order to determine the optimum sizes of the packaging 113 that is employed by the materials handling facility 103 to package items for shipping, the packaging suite manager 109 performs various functions and/or calculations based upon shipping volumes 126 that are stored in the respective materials handling facility management system 106. According to one embodiment, the packaging suite manager 109 and the shipping volumes 126 may be stored and/or executed within a suitable computing system as will be described.

The packaging 113 used to package the items that are shipped to respective shipping destinations 119 may comprise any one of a number of different types of packaging. For example, the packaging may comprise, for example, boxes, crates, cases, envelopes, encasements, bundles, packets, cartons, bins, receptacles, containers, capsules, and other types of packaging. The packaging 113 may come in many different sizes and shapes. Also, the packaging may be constructed of many different materials including, for example, paper, plastic, cardboard (which is typically constructed from paper), rubber, metal, or other materials. In addition, for purposes of the present discussion, the term "shipment" refers to items that are grouped for shipment from a given materials handling facility 103. It may be the case that a given shipment will be shipped in multiple packages 123. It is also possible that a given shipment may be sent in a single package 123.

In the case that the materials handling environment 100 facilitates order fulfillment, individuals at the respective shipping destinations 119 may generate orders 133 for goods or items. The orders 133 may be transmitted to an order processing system associated with the materials handling facility 103, for example, over the Internet or other transmission medium. Ultimately, the ordered items are obtained from various bins or other structures within the materials handling facility 103 and are packaged for shipment to their respective shipping destination 119 in the form of one or more packages 123.

The materials handling facility 103 employs the packaging suite 116 comprising a predefined number of different sizes of packaging 113. For example, the materials handling facility 103 may employ a predefined number of different sizes of boxes or other packaging. The packaging suite manager 109 is implemented in order to optimize the sizes of the packaging 113 used by the materials handling facility 103 so as to minimize underutilization of shipping space and other costs.

According to various embodiments, the packaging suite manager 109 calculates new sizes of the packaging 113 in the packaging suite 116 employed by the materials handling facility 103 from time to time. This calculation is based upon the shipping volumes 126 obtained from packages 123, shipments, or other materials handling events that occur over a predefined period of time. Alternatively, the calculation may be based upon the shipping volumes 126 associated with shipments of items to occur over a period of time in the future. As an additional alternative, the calculation may be based upon shipping volumes 126 associated with a combination of shipments that have occurred in the past and shipments that will occur in the future.

In one embodiment, the packaging suite manager 109 generates one or more orders for packaging that includes packaging sizes 136 that are forwarded to a respective packaging supplier 139 or to a packaging machine 143. The packaging supplier 139 can then respond by creating the respective sizes of packaging 113 in the newly ordered packaging suite 116. The packaging supplier 139 may then ship the same to the materials handling facility 103 to facilitate shipping of items in the form of packages 123 to the respective shipping destinations 119.

Alternatively, the materials handling facility 103 may include one or more packaging machines 143 located on site that can generate the packaging 113 in the respective sizes of the new packaging suite 116 as indicated by the packaging sizes 136. The packaging 113 is then used by the materials handling facility 103 for packaging of items as described above.

Figure 2:
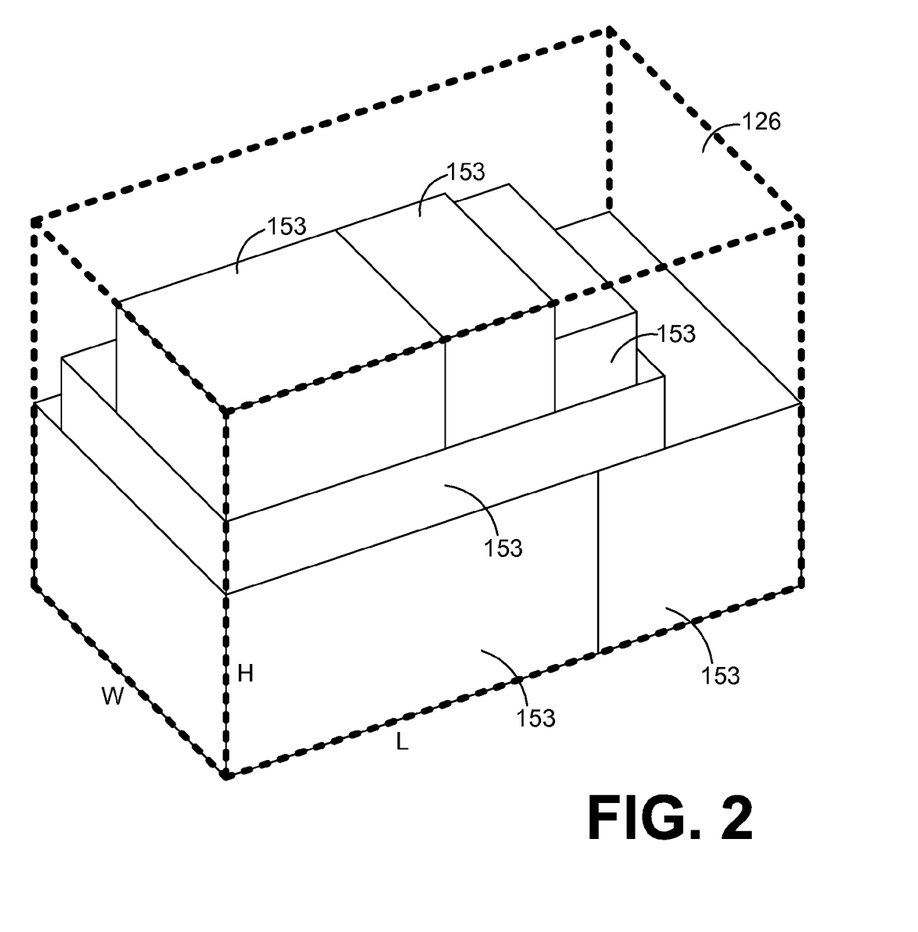
FIG. 2 is a drawing of one example of a shipping volume that encloses a group of items that may be shipped in the order fulfillment environment of FIG. 1 according to an embodiment of the present invention.

With reference to FIG. 2, shown is one example of a shipping volume 126 according to an embodiment of the present invention. As contemplated herein, a "shipping volume" refers to an amount of three dimensional space that is necessary to enclose at least one item 153 that is subject to or will be subject to shipping to a destination. The destination may be external to or internal to a materials handling facility 103. It is understood that the items 153 are shown merely as examples of various items that may be enclosed by a given shipping volume 126.

According to one embodiment, the shipping volume 126 comprises a three dimensional bounding box that includes a length L, a width W, and a height H. The length L is typically the maximum dimension of the items 153 associated with the shipping volume 126 as they would be arranged together in a package according any suitable packing algorithm as described, for example, in co-pending U.S. patent application entitled "System and Method for Packaging Performance Analysis" filed on May 4, 2007 and assigned application Ser. No. 11/744,336. Also, the width W and height H may involve the widths and/or heights of multiple items 153 placed adjacent to each other, etc. In this respect, any one of the length L, width W, and height H may involve the placement of multiple items 153 adjacent to each other or any one of the length L, width W, and height H may be associated with a single dimension of a single one of the items 153.

It may be the case that the items 153 associated with a given shipping volume 126 do not completely take up the three dimensional space within the shipping volume 126 due to the various shapes of the items 153 themselves relative to each other. On the other hand, where the items are all the same size, the three dimensional space associated with a shipping volume 126 may be entirely occupied by the items 153 associated therewith.

In addition, a given shipping volume 126 may also include the three dimensional space necessary to include buffering or packing materials that are used to create a buffer zone between a given item 153 in a package 123 and the sides of the package 123. Such a buffer zone may prevent damage to the items 153 in the package 123 due to rough handling or dropping, etc.

A shipping volume 126 may be associated with an entire shipment, where all the items associated with a given shipment are shipped in a single package 123. Alternatively, the shipping volume 126 may be associated with individual packages 123 that are shipped from the materials handling facility 103 to respective shipping destinations 119. As mentioned above, in some cases, the shipments may be split up amongst several packages 123. Thus, for some packages 123, the shipping volume 126 may be associated with an entire shipment, whereas for others, the shipping volume 126 may be associated with part of a shipment.

The optimization of the sizes of the packaging 113 in the packaging suite 116 may be performed based upon shipping volumes 126 associated with entire shipments regardless of whether they are shipped in a single package 123. Alternatively, the optimization of the sizes of the packaging in the packaging suite 116 may be performed base on shipping volumes 126 associated with the individual packages 123 that are transmitted to respective destinations 119. The individual packages 123 may involve entire or partial shipments. Still further, some combination of shipping volumes associated with both entire shipments and individual packages 123 may be taken into account in the optimization of the sizes of the packaging 113 in the packaging suite 116.

Figure 3:
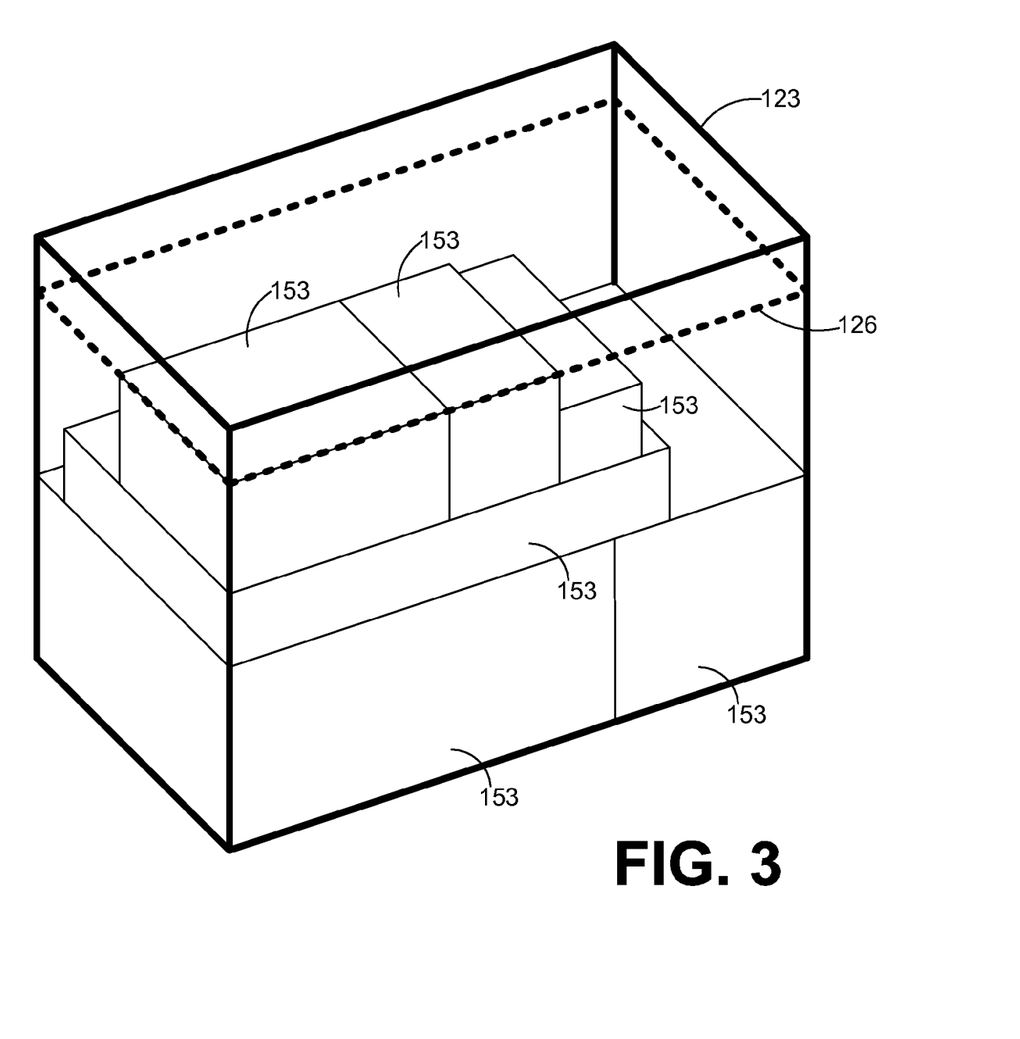
FIG. 3 is a drawing of one example of a package shipped in the order fulfillment environment of FIG. 1 that illustrates a mismatch between a shipping volume and the volume of the packaging of the package according to an embodiment of the present invention.

With reference to FIG. 3, shown is a drawing of a volume of a package 123 as compared with a shipping volume 126 of a plurality of items 153 included in the package 123. The shipping volume 126 depicted in FIG. 3 is essentially the same as the shipping volume 126 depicted with respect to FIG. 2. However, the shipping volume 126 of FIG. 3 is depicted relative to an internal volume of a package 123 into which the items 153 may be placed for shipment, thereby resulting in one of the packages 123 (FIG. 1).

As shown, the volume of the package 123 comprises the volume of the interior of the package 123 that may be employed to contain items 153. The volume of the package 123 is larger than the shipping volume 126. To the extent that the volume of the package 123 is greater than the shipping volume 126, such translates into wasted space as shipping vehicles will necessarily need to use up space for the size of the package 123 in excess of the shipping volume 126, even though nothing is gained by the extra space in the package 123.

Figure 4:
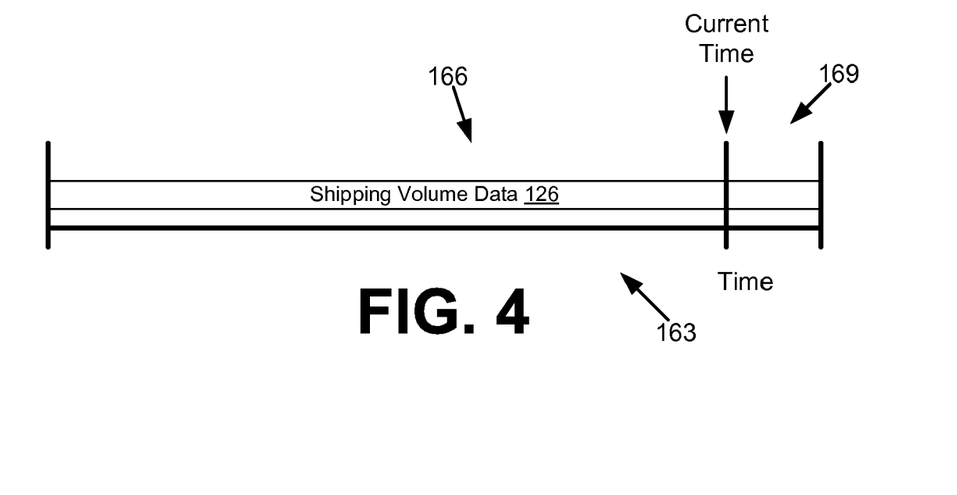
FIG. 4 is a diagram of an example of a time line that illustrates when shipping volumes of FIG. 2 are obtained and stored for analysis according to an embodiment of the present invention.

With reference to FIG. 4, shown is a timeline that illustrates the various periods of time over which the shipping volumes 126 may be gathered in association with packages 123 or shipments that are shipped from the materials handling facility 103 to respective shipping destinations 119. In particular, the timeline 163 includes a period of time in the past 166 in which actual packages 123 associated with one or more shipments have been shipped from the materials handling facility 103 to the respective shipping destinations 119. Such shipping volumes 126 are actual shipping volumes 123 in that they have already been shipped at some time in the past 166. There are also shipping volumes that are subject to shipment in the future 169. Such shipping volumes 126 are associated with orders for goods that have not yet been fulfilled. Such orders might stretch a predefined period of time into the future 169. Such a time period in the future may comprise, for example, any time frame, although a typical time frame might be approximately a couple of weeks.

The timeline 163 reflects the fact that shipping volumes 126 associated with the operation of a given materials handling facility 103 may change over time due to many factors. For example, assume that the materials handling facility 103 is operated by a merchant who sells goods over the Internet. Such a merchant may offer specific sales or other special offers that might cause certain products to ship with greater quantities during given periods of time. Such activity inevitably changes the nature of the shipping volumes 126 associated with the respective shipments and packages 123 sent from a respective materials handling facility 103 over such time.

Also, the inventory of products offered by such a merchant might change over time, thereby resulting in changes in the shipping volumes 123 of shipments or packages 123 sent by the materials handling facility 103. Also, seasonal events may affect the shipping volumes 126 over time. For example, products bought near the end of the year during the holiday season might involve shipping volumes 126 that differ drastically from products sold, for example, during the summer or in the spring. Furthermore, many products are seasonal in nature which may affect shipping volumes 126. For example, bulkier winter clothing sold during the fall may involve larger shipping volumes 126 than lightweight summer clothing sold in the spring.

Given that the shipping volumes 126 of shipments or packages 123 shipped by a given materials handling facility 103 may change over time, then according to various embodiments, the packaging suite manager 109 is employed to determine the optimum sizes of the packaging 113 of the packaging suite 116 at predefined points in time. The optimization of the sizes of the packaging 113 in the packaging suite 116 used by the materials handling facility 103 aids in minimizing the empty volume space resulting from a mismatch between the internal volume of packages 123 and the shipping volumes 126 associated therewith.

Since the shipping volumes 126 change over time, the packaging suite manager 109 may be employed to periodically resize the packaging 113 used in the packaging suite 116 for the materials handling facility 103. This is done so that the sizes of the packaging 113 of the packaging suite 16 are optimized for the current items shipped from the materials handling facility 103. The packaging suite manager 109 (FIG. 1) may be employed to calculate the sizes of the packaging 113 of the packaging suite 116 based upon shipping volumes 126 that are stored in a memory for a predetermined period of time in the past 166 or the future 169.

For example, the packaging suite manager 109 may be employed to periodically calculate the sizes of the packaging 113 of the packaging suite 116 every three months or other time period in the past 166. The sizes calculated may be transmitted to the packaging supplier 139 to obtain packaging in new sizes for the packaging suite 116 of the materials handling facility 103. Alternatively, it may be possible to obtain the shipping volumes 126 from orders for goods to be shipped in the future 169. Such packaging sizes 136 may be provided to a packaging supplier 139 or a packaging machine 143 (FIG. 1) to generate the packaging 113 of the packaging suite 116 in a "just-in-time" scenario.

Figure 5:
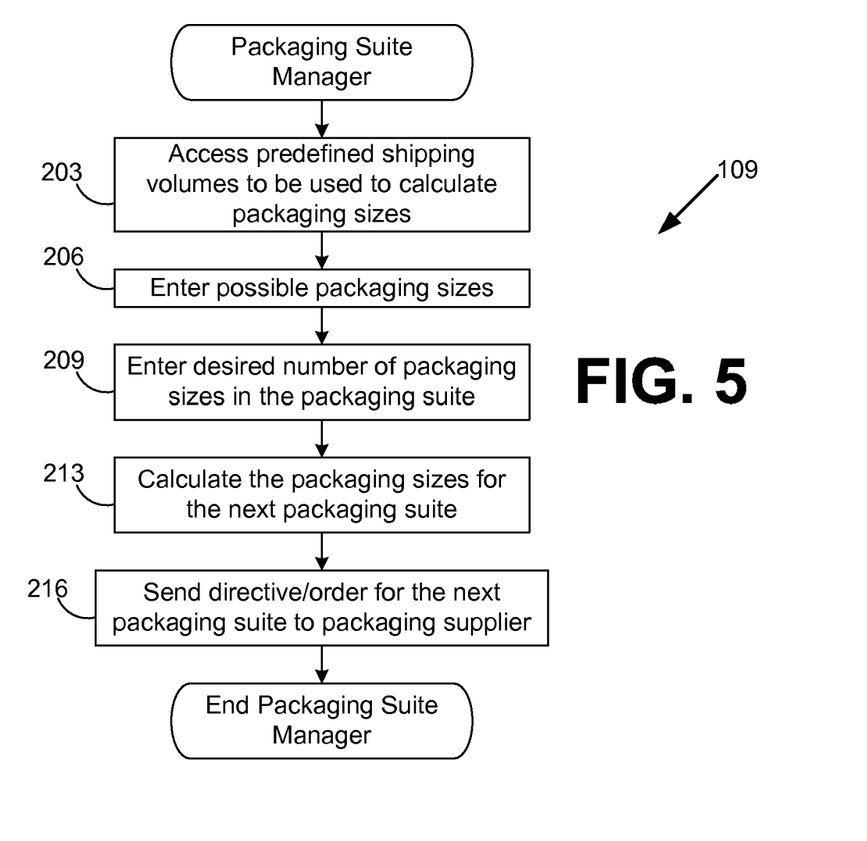
FIG. 5 is a flow chart that provides one example of a packaging suite manager that is employed in the order fulfillment environment of FIG. 1 to optimize sizes of packaging employed in shipping items according to an embodiment of the present invention.

Turning then to FIG. 5, shown is a flowchart that provides one example of at least one component operation of the packaging suite manager 109 according to an embodiment of the present invention. Alternatively, the flow chart of FIG. 5 may be viewed as depicting steps of an example of a method implemented in a computer system, for example, to determine optimum sizes of packaging 113 (FIG. 1) in a packaging suite 116 (FIG. 1) employed in a materials handling facility 103 (FIG. 1). The functionality of the packaging suite manager 109 as depicted by the example flow chart of FIG. 5 may be implemented, for example, in an object oriented design or in some other programming architecture. Assuming the functionality is implemented in an object oriented design, then each block represents functionality that may be implemented in one or more methods that are encapsulated in one or more objects. The packaging suite manager 109 may be implemented using any one of a number of programming languages such as, for example, C, C++, or other programming languages.

Beginning with box 203, the packaging suite manager 109 accesses the shipping volumes 126 stored in a memory to be used to calculate the sizes of the packaging 113 of the packaging suite 116 employed by the materials handling facility 103 as described above. In this respect, the packaging suite manager 109 may receive an input from a user that indicates the shipping volumes 126 to be accessed based, for example, on dates on which the respective packages 123 were shipped. Alternatively, the packaging suite manager 109 may be configured to automatically access the shipping volumes 126 associated with packages 123 shipped during a predefined period of time, etc.

Then, in box 206, the packaging suite manager 109 receives the possible packaging sizes as an input entered in by a user. Alternatively, the possible packaging sizes may be stored in a memory and accessed by the packaging suite manager 109, where such possible packaging sizes were stored in the memory by a user on a previous occasion. Next, in box 209 the packaging suite manager 109 receives the desired number of different packaging sizes in the packaging suite 116 as is entered by a user. Alternatively, the desired number of different packaging sizes may be stored in a memory and accessed by the packaging suite manager 109, where the desired number of different packaging sizes were stored in the memory by a user on a previous occasion.

Then, in box 213, the packaging suite manager 109 calculates the packaging sizes for the packaging suite 116 to be employed by the materials handling facility 103. This may be done, for example, by employing a so-called "P-median" solver that is adapted to obtain the optimum sizes of packaging 113 in the packaging suite 116.

A P-median solver may be employed, for example, to locate fulfillment centers relative to customers. In such a scenario, there is a cost between each pairing between a customer and a fulfillment center given that there is a predefined number of fulfillment centers that an organization may wish to operate in a specific geographical area. A P-median solver may then be used to find an optimal location of fulfillment centers such that shipping costs to customers is minimized. Stated another way, for a given a number of customers located at specific locations, a number of possible fulfillment centers, a fulfillment cost between each paired customer and fulfillment center, and given a total number of fulfillment centers one may wish to open, a P-median solver may be used to determine which fulfillment centers should be opened such that the overall fulfillment cost is minimized.

For example, let us consider a set $I=\{1 \ldots n\}$ of potential locations for p facilities, a set $J=\{1 \ldots m\}$ of customers, and n,m,matrix($g_{ij}$) of transportations costs for satisfying the demands of the customers from the facilities. The P-median problem is to locate the p facilities at locations of I in order to minimize the total transportation cost for satisfying the demand of the customers. Each customer is supplied from the closest open facility based upon the following equation:

$$F(S) = \sum_{j \in J} \min_{i \in S} g_{ij} \rightarrow \min_{S \subseteq I, |S|=p}$$

Given the foregoing, a P-median solver may also be employed to determine the optimal sizes of the packaging 113 in the packaging suite 116. Specifically, a P-median solver is set up similar as described above, except that the locations of customers are replaced with the shipping volumes 126, the possible locations of the fulfillment centers are replaced by the possible packaging sizes, and the cost of shipping between a given fulfillment center and a given customer is replaced by the empty space calculated by subtracting a given shipping volume 126 from the interior volume of a package 123 in which the items associated with the shipping volume 126 are transmitted times the quantity of shipping volumes 126.

The total number of fulfillment centers to be located is replaced by the total number of different sizes of packaging 113 that are to be included in a given packaging suite 116. Thus, by employing a P-median solver, the optimal sizes of packaging 113 for a given packaging suite 116 employed by a materials handling facility 103 may be determined.

Next, in box 216, the packaging suite manager 109 may be configured to send an order or directive for packaging 116 to a packaging supplier 139 so that the materials handling facility 103 can have the most up to date sizes of packaging 113 in the packaging suite 116. Thus, the packaging suite manager 109 may be employed to optimize the sizes of the packaging 113 in the packaging suite 116 so as to attempt to minimize the wasted volume of the packages 123 sent from the materials handling facility 103 to the shipping destinations 119.

The packaging suite manager 109 may be run as often as is reasonably possible to make appropriate changes in the sizes of the packaging 113 of the packaging suite 116. The actual time period between calculations of new packaging sizes may depend upon the need lead time between ordering new packaging 113 for the packaging suite 116 and actually receiving the new packaging 113 from the packaging supplier 139. In some cases, it may be necessary to replace a subset of the sizes in a given packaging suite 116, where the packaging suite manager 109 may be rerun frequently (i.e. every day, etc.) to determine if any one or more sizes of packaging 113 in the packaging suite 116 should be adjusted.

Figure 6:
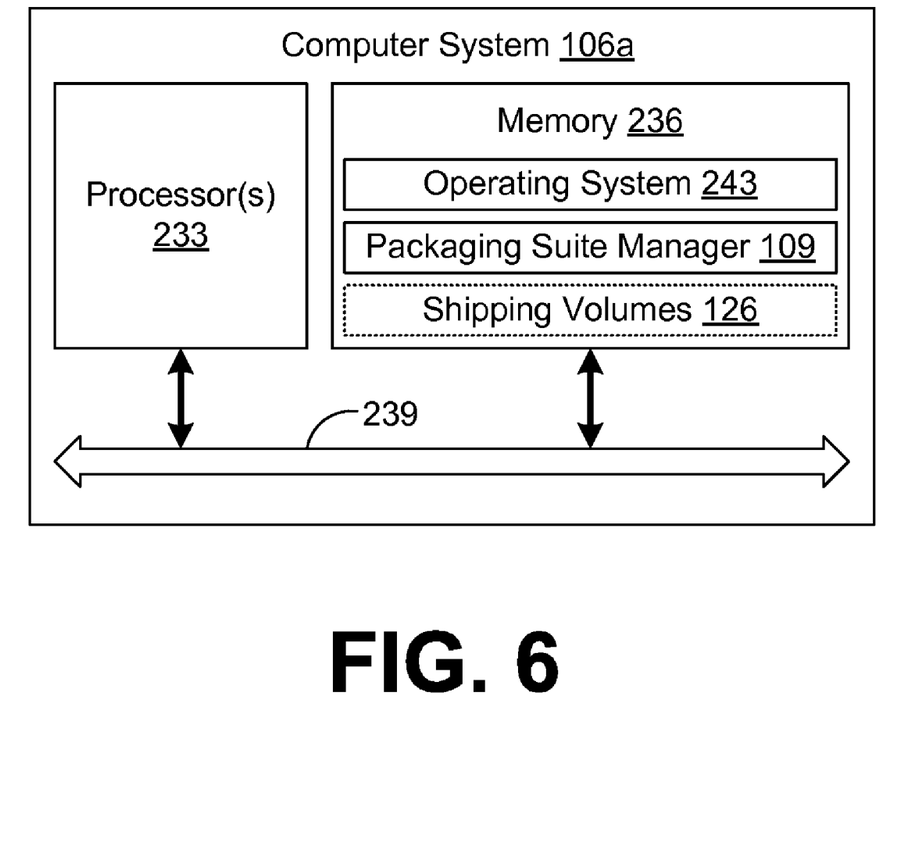
FIG. 6 is a schematic block diagram of one example implementation of a packaging suite manager illustrated in the example flow chart of FIG. 5 according to an embodiment of the present invention.

With reference to FIG. 6, shown is one example of a computer system 106a that may comprise, for example a computer, server, or like system. The computer system 106a may comprise one of the materials handling facility management systems 106 according to an embodiment of the present invention. The computer system 106a may include one or more processor circuits having a processor 233 and a memory 236, both of which are coupled to a local interface 239. In this respect, the local interface 239 may comprise, for example, a data bus with an accompanying control/address bus as can be appreciated. Where the computer system 106a comprises a server, such a server may comprise a server computer as can be appreciated.

Stored on the memory 236 and executable by the processor 233 are various components such as an operating system 243 and the packaging suite manager 109. Also, the shipping volumes 126 may be stored in the memory 236 as can be appreciated. In addition, it is understood that many other systems or components may be stored in the memory 236 and executable by the processors 233. Also, such components may reside in a memory that is external from the computer system 106a as can be appreciated.

As set forth above, the operating system 243 and packaging suite manager 109 are stored in the memory 236 and are executable by the processor 233. In this respect, the term "executable" refers to a program file that is in a form that can ultimately be run by the processor 233. Examples of executable programs may be, for example, a compiled program that can be translated into machine code in a format that can be loaded into a random access portion of the memory 236 and run by the processor 233, or source code that may be expressed in proper format such as object code that is capable of being loaded into a random access portion of the memory 236 and executed by the processor 233. An executable program may be stored in any portion or component of the memory 236 including, for example, random access memory, read-only memory, a hard drive, compact disk (CD), floppy disk, or other memory components.

The memory 236 is defined herein as both volatile and nonvolatile memory and data storage components. Volatile components are those that do not retain data values upon loss of power. Nonvolatile components are those that retain data upon a loss of power. Thus, the memory 236 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 233 may represent multiple processors and the memory 236 may represent multiple memories that operate in parallel. In such a case, the local interface 239 may be an appropriate network that facilitates communication between any two of the multiple processors, between any processor and any one of the memories, or between any two of the memories, etc. The processor 233 may be of electrical, optical, or of some other construction as can be appreciated by those with ordinary skill in the art.

The operating system 243 is executed to control the allocation and usage of hardware resources such as the memory and processing time in the computer system 106a. In this manner, the operating system 243 serves as the foundation on which applications depend as is generally known by those with ordinary skill in the art.

Although the functionality of the packaging suite manager 109 is generally described above as being embodied in software or code executed by general purpose hardware, as an alternative the same may also be embodied in dedicated hardware or a combination of software/general purpose hardware and dedicated hardware. If embodied in dedicated hardware, the functionality of the packaging suite manager 109 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc.

Such technologies are generally well known by those skilled in the art and, consequently, are not described in detail herein.

The flow chart of FIG. 5 shows one example of an implementation of the functionality of the packaging suite manager 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the various embodiments of the present invention.

Also, where the functionality of the packaging suite manager 109 is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present invention, a "computer-readable medium" can be any medium that can contain, store, or maintain the network page for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A system, comprising:
a processor circuit having a processor and a memory;
a plurality of shipping volumes stored in the memory, each shipping volume comprising a three-dimensional bounding box around at least one item;
a packaging suite manager stored in the memory and executable by the processor;
the packaging suite manager being configured to determine a plurality of sizes of packaging in a packaging suite employed in a materials handling facility based upon the shipping volumes, the packaging in the packaging suite being used for a plurality of shipments;
the packing suite manager determining the plurality of sizes of packaging in the packaging suite by calculating the plurality of sizes based upon the shipping volumes, a maximum number of sizes of packaging specified for the packaging suite, a plurality of possible packaging sizes in the packaging suite using a P-median solver;
wherein each of the shipping volumes are associated with a corresponding at least one item shipped in a package from the materials handling facility to a plurality of customers over a predefined period of time, or with a plurality of items to be shipped from the materials handling facility to a plurality of customers in the future; and
the packaging suite manager being further configured to periodically generate an order for the packaging in the packaging suite after the determination of the sizes of packaging in the packaging suite.

2. The system of claim 1, wherein the packaging in the packaging suite further comprises a plurality of boxes.

3. The system of claim 1, wherein the packaging in the packaging suite further comprises a plurality of envelopes.

4. A method, comprising the steps of:
storing a plurality of shipping volumes in a memory, each one of the shipping volumes enclosing a collection of at least one item and being associated with one of a plurality of different orders for goods, at least some of the shipping volumes differing with respect to each other;
determining, in a computer system, a plurality of sizes of packaging in a packaging suite employed in a materials handling facility based at least in part upon the plurality of shipping volumes, the packaging in the packaging suite being used for a plurality of shipments;
wherein the sizes of the packaging are not predetermined; and
wherein the step of determining the plurality of sizes of packaging in the packaging suite further comprises the step of calculating the plurality of sizes based upon the shipping volumes using a P-median solver.

5. The method of claim 4, further comprising the step of determining the shipping volumes by calculating a plurality of dimensions of a three-dimensional bounding box around the at least one item.

6. The method of claim 4, wherein the shipping volumes are associated with a plurality of items to be shipped from the materials handling facility to a plurality of customers in the future.

7. The method of claim 4, further comprising the step of generating an order for the packaging in the packaging suite after the determination of the sizes of packaging in the packaging suite.

8. The method of claim 4, wherein the packaging in the packaging suite further comprises a plurality of boxes.

9. The method of claim 4, wherein the packaging in the packaging suite further comprises a plurality of envelopes.

10. A method, comprising the steps of:

storing a plurality of shipping volumes in a memory, each shipping volume enclosing a collection of at least one item;

determining, in a computer system, a plurality of sizes of packaging in a packaging suite employed in a materials handling facility based upon the shipping volumes, the packaging in the packaging suite being used for a plurality of shipments; and wherein the step of determining the plurality of sizes of packaging in the packaging suite further comprises the step of calculating the plurality of sizes based upon the shipping volumes using a P-median solver.

11. The method of claim 10, further comprising the step of specifying a maximum number of sizes of packaging in the packaging suite.

12. The method of claim 10, further comprising the step of specifying a plurality of possible packaging sizes in the packaging suite.

13. A method, comprising the steps of:

storing a plurality of shipping volumes in a memory, each one of the shipping volumes enclosing a collection of at least one item and being associated with one of a plurality of different orders for goods;

determining, in a computer system, a plurality of sizes of packaging in a packaging suite employed in a materials handling facility based at least in part upon the plurality of shipping volumes, the packaging in the packaging suite being used for a plurality of shipments;

wherein each of the shipping volumes is associated with a corresponding at least one item shipped in a package from the materials handling facility to a plurality of customers over a predefined period of time;

wherein the sizes of the packaging are not predetermined; and wherein the step of determining the plurality of sizes of packaging in the packaging suite further comprises the step of calculating the plurality of sizes based upon the shipping volumes using a P-median solver.

14. A method, comprising the steps of:

storing a plurality of shipping volumes in a memory, each one of the shipping volumes enclosing a collection of at least one item and being associated with one of a plurality of different orders for goods;

determining, in a computer system, a plurality of sizes of packaging in a packaging suite employed in a materials handling facility based at least in part upon the plurality of shipping volumes, the packaging in the packaging suite being used for a plurality of shipments;

wherein the sizes of the packaging in the packaging suite are determined periodically at predefined time intervals;

wherein the sizes of the packaging are not predetermined; and wherein the step of determining the plurality of sizes of packaging in the packaging suite further comprises the step of calculating the plurality of sizes based upon the shipping volumes using a P-median solver.

15. The method of claim 14, further comprising the step of generating an order for the packaging in the packaging suite after each determination of the sizes of packaging in the packaging suite.

16. A system, comprising:

a processor circuit having a processor and a memory;

a plurality of shipping volumes stored in the memory, each one of the shipping volumes enclosing at least one item and being associated with one of a plurality of orders for goods, at least some of the shipping volumes differing with respect to each other;

a packaging suite manager stored in the memory and executable by the processor, the packaging suite manager being configured to determine a plurality of sizes of packaging in a packaging suite employed in a materials handling facility based at least in part upon the shipping volumes, the packaging in the packaging suite being used for a plurality of shipments;

wherein the sizes of the packaging are not predetermined; and wherein the packaging suite manager determines the plurality of sizes of packaging in the packaging suite by calculating the plurality of sizes based upon the shipping volumes using a P-median solver.

17. The system of claim 16, wherein the packaging suite manager calculates the plurality of sizes further based upon a maximum number of sizes of packaging specified for the packaging suite.

18. The system of claim 16, wherein the packaging suite manager calculates the plurality of sizes further based upon a plurality of possible packaging sizes in the packaging suite.

19. The system of claim 16, wherein each of the shipping volumes is associated with a corresponding at least one item shipped in a package from the materials handling facility to a plurality of customers over a predefined period of time.

20. The system of claim 19, wherein each of the shipping volumes comprises a three-dimensional bounding box around the at least one item, where at least some of the shipping volumes are shipped in respective ones of the packages having a maximum interior volume that is greater than the respective shipping volumes.

21. The system of claim 16, wherein the shipping volumes are associated with a plurality of items to be shipped from the materials handling facility to a plurality of customers in the future.

22. The system of claim 16, wherein the packaging suite manager is further configured to generate an order for the packaging in the packaging suite after the determination of the sizes of packaging in the packaging suite.

23. The system of claim 16, where the packaging suite manager is further configured to determine the sizes of the packaging in the packaging suite periodically at predefined time intervals.

24. The system of claim 16, wherein the packaging in the packaging suite further comprises a plurality of boxes.

25. The system of claim 16, wherein the packaging in the packaging suite further comprises a plurality of envelopes.

26. The system of claim 16, wherein each of the shipping volumes comprises a three-dimensional bounding box around the at least one item.

27. A system, comprising:

a plurality of shipping volumes stored in a memory, each one of the shipping volumes enclosing at least one item and being associated with one of a plurality of different orders for goods, at least some of the shipping volumes differing with respect to each other;

means for determining a plurality of sizes of packaging in a packaging suite employed in a materials handling facility based at least in part upon the plurality of shipping volumes, the packaging in the packaging suite being used for a plurality of shipments;

wherein the sizes of the packaging are not predetermined; and wherein the means for determining determines the plurality of sizes of packaging in the packaging suite by calculating the plurality of sizes based upon the shipping volumes using a P-median solver.

28. The system of claim 27, wherein each of the shipping volumes comprises a three-dimensional bounding box around the at least one item.

29. The system of claim 27, wherein the means for determining the plurality of sizes of packaging in the packaging suite further comprises means for calculating the plurality of sizes based upon the shipping volumes, a maximum number of sizes of packaging specified for the packaging suite, and a plurality of possible packaging sizes in the packaging suite.

30. The system of claim 27, wherein each of the shipping volumes are associated with a corresponding at least one item shipped in a package from the materials handling facility to a plurality of customers over a predefined period of time.

31. The system of claim 30, wherein each of the shipping volumes comprises a three-dimensional bounding box around the at least one item, where at least some of the shipping volumes are shipped in respective ones of the packages having a maximum interior volume that is greater than the respective shipping volumes.

32. The system of claim 27, further comprising means for generating an order for the packaging in the packaging suite after the determination of the sizes of packaging in the packaging suite.

33. The system of claim 27, where the sizes of the packaging in the packaging suite are determined periodically at predefined time intervals.

34. The system of claim 27, wherein the packaging in the packaging suite further comprises a plurality of boxes.

35. The system of claim 27, wherein the packaging in the packaging suite further comprises a plurality of envelopes.

36. A non-transitory computer-readable medium embodying a program executable by a processor circuit, comprising:
    code that determines a plurality of sizes of packaging in a packaging suite employed in a materials handling facility based at least in part upon a plurality of shipping volumes, the packaging in the packaging suite being used for a plurality of shipments; and
    each one of the shipping volumes enclosing at least one item and being associated with one of a plurality of different orders for goods, at least some of the shipping volumes differing with respect to each other;
    wherein the sizes of the packaging are not predetermined; and
    wherein the code that determines is configured to determine the plurality of sizes of packaging in the packaging suite by calculating the plurality of sizes based upon the shipping volumes using a P-median solver.

37. The non-transitory computer-readable medium embodying the program executable by the processor circuit of claim 36, wherein each of the shipping volumes comprises a three-dimensional bounding box around the at least one item.

38. The non-transitory computer-readable medium embodying the program executable by the processor circuit of claim 36, wherein each of the shipping volumes is associated with a corresponding at least one item shipped in a package from the materials handling facility to a plurality of customers over a predefined period of time.

39. The non-transitory computer-readable medium embodying the program executable by the processor circuit of claim 36, wherein the shipping volumes are associated with a plurality of items to be shipped from the materials handling facility to a plurality of customers in the future.

40. The non-transitory computer-readable medium embodying the program executable by the processor circuit of claim 36, further comprising code that generates an order for the packaging in the packaging suite after the determination of the sizes of packaging in the packaging suite.

41. The non-transitory computer-readable medium embodying the program executable by the processor circuit of claim 36, wherein the sizes of the packaging in the packaging suite are determined periodically at predefined time intervals.

42. A non-transitory computer-readable medium embodying a program executable by a processor circuit, comprising:
    code that determines a plurality of sizes of packaging in a packaging suite employed in a materials handling facility based upon a plurality of shipping volumes, the packaging in the packaging suite being used for a plurality of shipments;
    each of the shipping volumes enclosing at least one item; and
    wherein the code that determines the sizes of packaging in the packaging suite calculates the plurality of sizes using a P-median solver based upon the shipping volumes, a maximum number of sizes of packaging specified for the packaging suite, and a plurality of possible packaging sizes in the packaging suite.

43. A method, comprising the steps of:
    storing a plurality of shipping volumes in a memory, each one of the shipping volumes enclosing a collection of at least one item and being associated with one of a plurality of different orders for goods;
    determining, in a computer system, a plurality of sizes of packaging in a packaging suite employed in a materials handling facility based at least in part upon the plurality of shipping volumes, the packaging in the packaging suite being used for a plurality of shipments;
    wherein at least one of the collections of at least one item comprises a plurality of dissimilar items, and at least one of the collections is associated with a bounding box that is dissimilar relative to the remaining ones of the collections;
    wherein the sizes of the packaging are not predetermined; and
    wherein the step of determining the plurality of sizes of packaging in the packaging suite further comprises the step of calculating the plurality of sizes based upon the shipping volumes using a P-median solver.

44. A method, comprising the steps of:
    storing a plurality of shipping volumes in a memory, each one of the shipping volumes enclosing a collection of at least one item;
    determining, in a computer system, a plurality of sizes of packaging in a packaging suite employed in a materials handling facility based at least in part upon the plurality of shipping volumes, the packaging in the packaging suite being used for a plurality of shipments;
    wherein the collections of at least one item are randomly grouped;
    wherein the sizes of the packaging are not predetermined; and
    wherein the step of determining the plurality of sizes of packaging in the packaging suite further comprises the step of calculating the plurality of sizes based upon the shipping volumes using a P-median solver.

* * * * *